United States Patent
Kalliokulju et al.

(10) Patent No.: US 6,526,100 B1
(45) Date of Patent: Feb. 25, 2003

(54) METHOD FOR TRANSMITTING VIDEO IMAGES, A DATA TRANSMISSION SYSTEM AND A MULTIMEDIA TERMINAL

(75) Inventors: Juha Kalliokulju, Vesilahti (FI); Erkko Lehtonen, Turku (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/301,908

(22) Filed: Apr. 29, 1999

(30) Foreign Application Priority Data

Apr. 30, 1998 (FI) .................................................. 980953

(51) Int. Cl.$^7$ ............................................... H04N 7/12
(52) U.S. Cl. ............................... 375/240.26; 348/425.1; 386/68
(58) Field of Search ................. 348/425.1; 375/240.26; 386/68

(56) References Cited

U.S. PATENT DOCUMENTS

| | | | |
|---|---|---|---|
| 4,931,879 A | 6/1990 | Koga et al. .................. | 386/111 |
| 5,479,303 A | 12/1995 | Suzuki et al. .............. | 360/72.2 |
| 5,557,639 A | 9/1996 | Heikkila et al. ............ | 375/224 |
| 5,576,902 A * | 11/1996 | Lane et al. .................. | 386/68 |
| 5,592,299 A | 1/1997 | Boyce et al. ................. | 386/68 |
| 5,596,677 A | 1/1997 | Jarvinen et al. ............ | 704/220 |
| 5,771,335 A * | 6/1998 | Lee .............................. | 386/68 |
| 5,835,889 A | 11/1998 | Kapanen ..................... | 704/215 |
| 5,854,978 A | 12/1998 | Heidari ....................... | 455/418 |
| 5,893,061 A | 4/1999 | Gortz .......................... | 704/262 |

FOREIGN PATENT DOCUMENTS

EP 0 676 898 A1 10/1995

OTHER PUBLICATIONS

Image Processing, 1995, Proceedings., International Conference on, vol. 1, 1995, Lina Karam and Chris Podilchuk, "Chroma Coding for Video at Very Low Bit Rates", p. 562–p. 565.
ITU–T Recommendation H.324 "Terminal for low bit-rate multimedia communication" (Feb. 6, 1998).
ITU–T Recommendation H.263 "Video coding for low bit-rate communication", Geneva 1998.
ITU–T Recommendation H.261 "Video codec for audiovisual service at p×64 kbits" (3/93).
ITU–T Recommendation G.723.1 (3/96) "Dual Rate Speech Coder for Multimedia Communications Transmitting at 5.3 and 6.3 kbit/s" (including Annex A, B, C).
Finnish Office Action (and English translation thereof).

* cited by examiner

*Primary Examiner*—Howard Britton
(74) *Attorney, Agent, or Firm*—Perman & Green, LLP

(57) ABSTRACT

The invention relates to a method for transmitting video images between multimedia terminals (1,1') in a data transmission system. In the video image transmission first video frames (I) are used, in which information encoded from one video image is transmitted, as well as second video frames (P, B) in which information encoded on the basis of two or more video images is transmitted, from which it is possible to generate a video image in the receiver multimedia terminal (1) by using at least one first (I) and at least one second video frame (P, B). In the method, the fast forward or fast rewind function of the video images is performed by transmitting primarily only first video frames (I).

34 Claims, 4 Drawing Sheets

METHOD FOR TRANSMITTING VIDEO IMAGES, A DATA TRANSMISSION SYSTEM AND A MULTIMEDIA TERMINAL

BACKGROUND OF THE INVENTION

The present invention relates to a method for transmitting video images between multimedia terminals in a data transmission system, in which video images are transmitted by using first video frames, in which information encoded from one video image is transmitted, as well as second video frames, in which information encoded on the basis of two or more video images is transmitted, from which a video image can be formed in the receiver multimedia terminal by using at least one first and at least one second video frame. The present invention also relates to a data transmission system, which comprises means for transmitting video images between multimedia terminals, means for forming first and second video frames from the video images, in which first video frames information encoded from one video image is arranged to be transmitted, and in the second video frames information encoded on the basis of two or more video images is arranged to be transmitted. The present invention relates furthermore to a multimedia terminal, which comprises means for receiving commands, and means for generating first and second video frames from video images, in which first video frames information encoded from one video image is arranged to be transmitted, and in the second video frames information encoded on the basis of two or more video images is arranged to be transmitted.

Multimedia applications are used for transmitting e.g. video image information, audio information and data information between a transmitting and receiving multimedia terminal. For data transmission the Internet data network or another communication system, such as a general switched telephone network (GSTN), is used. The transmitting multimedia terminal is, for example, a computer, generally also called a server, of a company providing multimedia services. The data transmission connection between the transmitting and the receiving multimedia terminal is established in the Internet data network via a router. Information transmission can also be duplex, wherein the same multimedia terminal is used both as a transmitting and as a receiving terminal. One such system representing the transmission of multimedia applications is illustrated in the appended FIG. 1. Definitions for such a multimedia terminal are presented in the International Telecommunication Union ITU-T Recommendation H.324 "Terminal for Low Bit-Rate Multimedia Communication" (Feb. 6, 1998).

The source of information can advantageously be a video application, an audio application, a data application or a combination of these, of which a collective term "multimedia application" is used in this description. In the multimedia application, the user of the multimedia terminal selects the location of the desired source of information, wherein a data transmission connection is established in the system between the selected access location of the information and the multimedia terminal of the user. Data frames, in which the information is transmitted in a digital format, are typically used for transmitting information. A separate data frame is advantageously produced for each different source type, or, in some situations, it is possible to combine data from two or more sources of information into one data frame. In the data transmission system, the data frames are transmitted to the multimedia terminal of the user. In practical applications, these data frames are temporally interlaced, wherein the actual data transmission stream is composed of temporally separated data frames of different applications. There are also systems under development, in which a separate, logical data transmission channel is allocated for different types of applications using, for example, different frequencies or, in CDMA-based systems, different spreading codes. In practice, the data transmission capacity of such data transmission systems is restricted because, for instance, the data transmission channel is physically band restricted and there can be several simultaneous data transmission connections, wherein the entire capacity of the data transmission system cannot be given to the use of any single data transmission connection. In mere audio applications, this does not usually impose a significant drawback, because the amount of information to be transmitted is relatively small. However, in the transmission of video information this restricted bandwidth sets high demands on the data transmission system.

The use of multimedia applications has also been developed in low bit rate data transmission systems, wherein the data transmission rates are in the order of 64 kbit/s, or lower.

The video application can be a TV image, an image generated by a video recorder, a computer animation, etc. One video image consists of pixels which are arranged in horizontal and vertical lines, and the number of which in one image is typically tens of thousands. In addition, the information generated for each pixel contains, for instance, luminance information about the pixel, typically with a resolution of eight bits, and in colour applications also chrominance information, e.g. a chrominance signal. This chrominance signal further consists of two components, Cb and Cr, which are transmitted with a resolution of eight bits. On the basis of these luminance and chrominance values, it is possible at the receiving end to form information corresponding to the original pixel on the display device of the multimedia terminal. In said example, the quantity of data to be transmitted for each pixel is 24 bits uncompressed. Thus, the total amount of information for one image amounts to several megabits. In the transmission of a moving image, several images are transmitted per second, for instance in a TV image, 25 images are transmitted per second. Without compression, the quantity of information to be transmitted would amount to tens of megabits per second. However, for example in the Internet data network, the data transmission rate can be in the order of 64 kbits per second, which makes real time image transmission via this network impossible without the use of compression techniques.

For reducing the amount of information to be transmitted, different compression methods have been developed, such as presented in the ITU-T Recommendation H.263 "Video Coding for Low Bit-Rate Communication", Geneva 1998. In the transmission of video, image compression can be performed either as interframe compression, intraframe compression, or a combination of these. In interframe compression, the aim is to eliminate redundant information in successive image frames. Typically, images contain a large amount of such non-varying information, for example a motionless background, or slowly changing information, for example when the subject moves slowly. In interframe compression, it is also possible to utilize motion compensation, wherein the aim is to detect such larger elements in the image which are moving, wherein the motion vector of this entity is transmitted instead of transmitting the pixels representing the whole entity. Thus, the direction of the motion and the speed of the subject in question is defined, to establish this motion vector. For compression, the transmitting and the receiving multimedia terminal are required to have such a high processing speed that it is possible to perform compression and decompression in real time.

In several image compression techniques, an image signal converted into digital format is subjected to a discrete cosine transform (DCT) and is subsequently quantised and coded before it is transmitted to a transmission path or stored in a storage means. In this context, the word discrete means that the DCT is calculated using sampled values of cosinusoidal functions, rather than continuous functions.

Using a DCT it is possible to calculate the frequency spectrum of a periodic signal. For example, it is possible to transform the signal from the time domain to the frequency domain. When the discrete cosine transform is applied to a single image, a two dimensional transform is required. Instead of time, the variables are the luminance and/or chrominance values of the pixels in the image. The frequency is not the conventional quantity relating to periods in a second, but indicates e.g. the rate of change of luminance in the direction of the location coordinates X, Y. This is called spatial frequency.

In an image signal, neighbouring pixels typically have substantial spatial correlation. One feature of the DCT is that the coefficients established as a result of the DCT are practically uncorrelated; hence the DCT conducts the transformation of the image signal from the pixel value (i.e. luminance/chrominance) domain to the spatial frequency domain in an effective (efficient) manner.

In an image which contains a large number of fine details, high spatial frequencies are present. For example, parallel lines in the image correspond to a higher frequency, the more closely they are spaced. In general, DCT-components corresponding to diagonally oriented features in an image can be quantized in image processing more without the quality of the image noticeably deteriorating.

In ITU-T Recommendation H.263, Section 4.2.1 "GOBs, Slices, Macroblocks and Blocks" there is described a compression method, in which the DCT is performed in blocks so that the block size is 8×8 pixels. The luminance information in the image is transformed with full spatial resolution. Both chrominance signals are spatially subsampled, for example a field of 16×16 pixels is subsampled into a field of 8×8 pixels. The differences in the block sizes are primarily due to the fact that the eye does not discern changes in chrominance equally well as changes in luminance, wherein a field of 2×2 pixels is encoded with the same chrominance value.

The ITU-T Recommendation H.263, Section 4.2.2 "Prediction" defines seven frame types, three of which are mentioned in this application: an I-frame (Intra), a P-frame (Predicted), and a B-frame (Bidirectional). The I-frame is generated solely on the basis of information contained in the image itself, wherein at the receiving end, this I-frame can be used to form the entire image. The P-frame is formed on the basis of the closest preceding I-frame or P-frame, wherein at the receiving stage the preceding I-frame or P-frame is correspondingly used together with the received P-frame. In the composition of P-frames, for instance motion compensation is used to compress the quantity of information. B-frames are formed on the basis of the preceding I-frame and the following P- or I-frame. Correspondingly, at the receiving stage it is not possible to compose the B-frame until the corresponding I-frame and P-frame have been received. Furthermore, at the transmission stage the order of these P- and B-frames is changed, wherein the P-frame following the B-frame is received first, which accelerates the reconstruction of the image in the receiver.

Of these three image types, the highest efficiency is achieved in the compression of B-frames. The appended FIG. 2 presents a data transmission stream, in which these three types of image frames are transmitted. It should be mentioned that the number of I-frames, P-frames and B-frames can be varied in the application used at a given time. It must, however, be noticed here that at least one I-frame must be received at the receiving end, before it is possible to reconstruct a proper image in the display device of the receiver.

In multimedia applications, data transmission in data frame format is also used in the transmission of an audio signal. Thus, both audio data frames and video data frames are preferably provided with identifications, on the basis of which these data transmission streams are connected together at the receiving end. In addition, it has to be possible to synchronize these data transmission streams in order to ensure that the image and the sound are reproduced substantially synchronously.

In an interactive application, the user of the multimedia terminal can control information transmission from the terminal. For example, in situations in which the user wishes to browse the image information faster forward or backward when searching for a desired location, the user enters the fast forward or fast rewind command, respectively, which is transmitted to a server transmitting multimedia information. Thus, the server transmits frames at a faster rate and these are received by the multimedia terminal. However, this fast forward or fast rewind function requires that the server has a high processing speed and a large memory capacity. In addition, the data transmission rate of the data transmission channel has to be sufficiently high to transmit the necessary quantity of information. In all systems this fast forward or fast rewind possibility cannot be implemented using equipment and data transmission channels of prior art. Thus, the user has to follow the multimedia application at normal speed and wait for the desired location to be found. This may take a great deal of time and, on the other hand, unnecessarily load the data transmission system and increase the operating costs.

SUMMARY OF THE INVENTION

One purpose of the present invention is to produce a method and a system, in which the fast forward and fast rewind functions are also possible when using data transmission channels with a low bit rate. The present invention is primarily characterized in that in the method the fast forward or fast rewind function of the video images is performed primarily by transmitting only first video frames. A data transmission system according to the present invention is primarily characterized in that the system further comprises means for performing the fast forward or fast rewind function of video images, wherein during the fast forward/rewind function, primarily only first video frames are arranged to be transmitted. A multimedia terminal according to the present invention is primarily characterized in that the multimedia terminal further comprises means for performing the fast forward or fast rewind function of the video images, wherein during the fast forward/rewind function, primarily only first video frames are arranged to be transmitted. The invention is based on the idea that during fast forward/rewind, only intra frames are transmitted. The number and time interval of these intra frames can be adjusted according to the need. Furthermore, it is possible to decrease, if necessary, the information content of these intra images, for example by compressing, reducing the resolution or transmitting them in black and white. Also the transmission of audio information can be interrupted for the time of fast forward/rewind, wherein it is possible to further reduce the amount of information to be transmitted in the fast forward/ rewind.

Considerable advantages are achieved with the present invention when compared with solutions of prior art. With a method according to the invention, it is also possible to implement the fast forward and fast rewind function in systems with a low bit rate without imposing an additional load on the data transmission system. The fast forward and fast rewind function implemented according to the invention does not require the multimedia server to have more processing or memory capacity. In the data transmission system according to the invention, it is also possible to reduce the loading of the system, because the quantity of information transmitted during fast forward/rewind is smaller, and it is possible to reach the correct location in a sequence of video images faster than in systems of prior art. Thereby data transmission and operating costs are also reduced.

BRIEF DESCRIPTION OF THE DRAWING

In the following, the invention will be described in more detail with reference to the appended figures, in which.

DETAILED DESCRIPTION OF THE INVENTION

Figure 1:
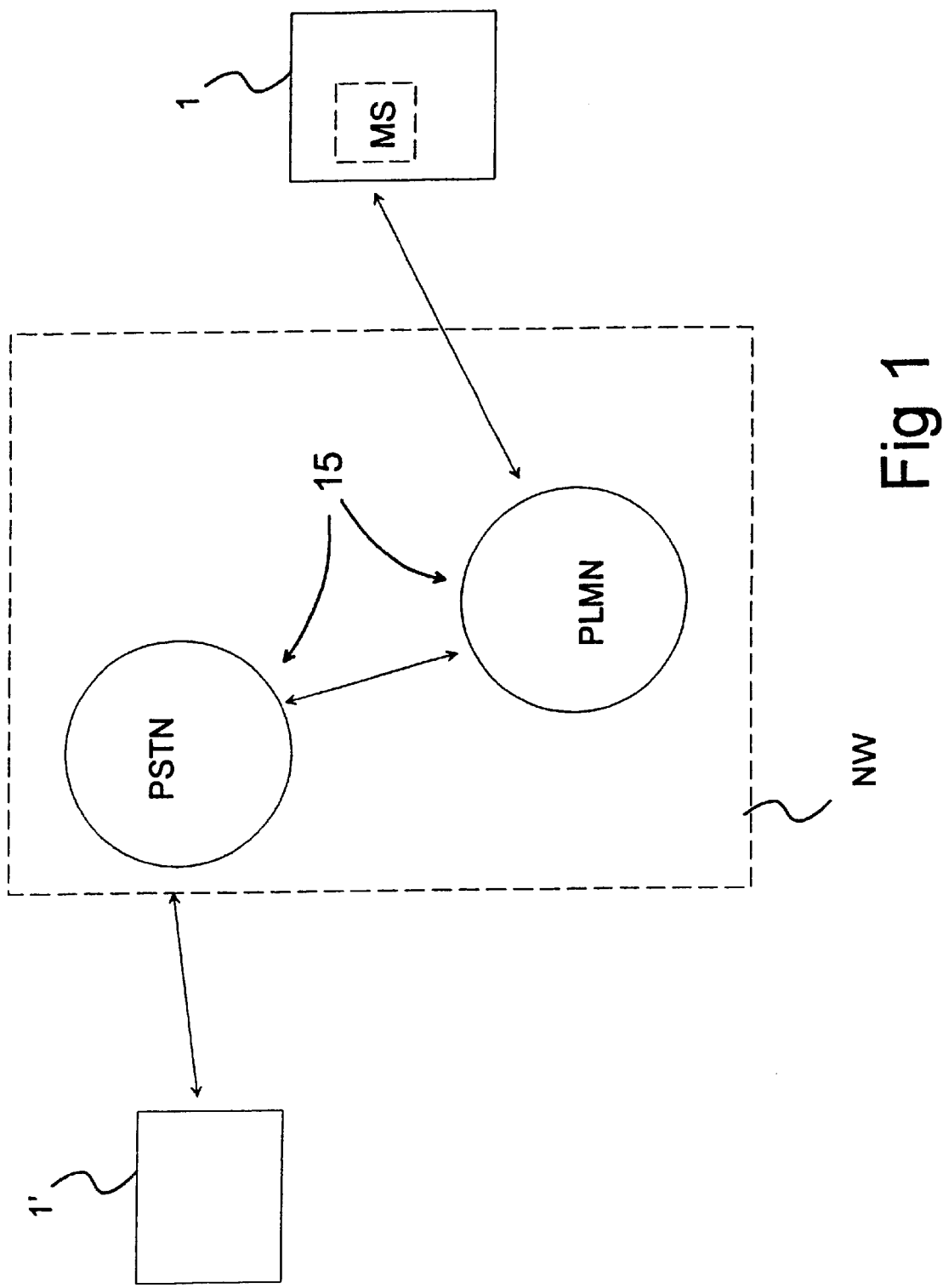
FIG. 1 shows a structure of a data transmission system.
Figure 2:
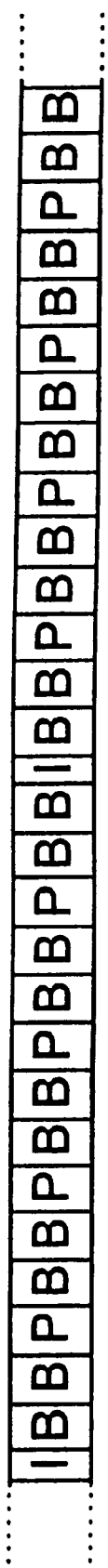
FIG. 2 shows a data transmission stream according to the H.263 recommendation in the transmission of image frames.

A data transmission system, such as that presented in FIG. 1, comprises a user multimedia terminal 1, a service provider multimedia terminal 1', and a data transmission network NW, such as a telecommunication network. It is obvious that in practical applications there are several user multimedia terminals 1 and several service provider multimedia terminals 1', but with respect to understanding the invention, it is sufficient that the invention is described by means of these two multimedia terminals 1, 1'. Between the user multimedia terminal 1 and the service provider multimedia terminal 1', preferably a duplex data transmission connection is established. Thus, the user can transmit, for instance, information retrieval addresses and control commands to the data transmission network NW and to the service provider multimedia terminal 1'. Correspondingly, from the service provider multimedia terminal 1' it is possible to transmit, for instance, information on multimedia applications to the user multimedia terminal 1.

Figure 3:
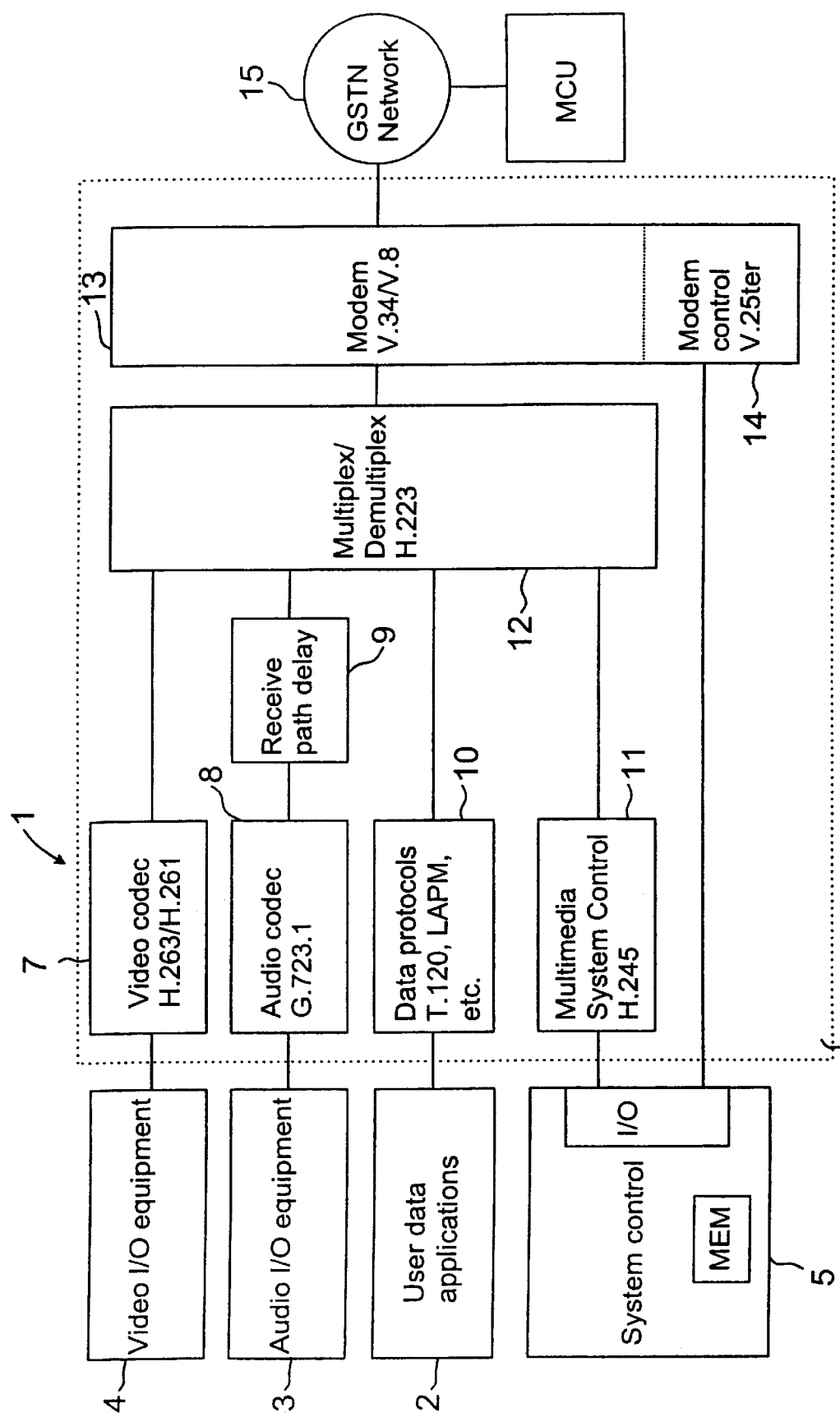
FIG. 3 shows a multimedia terminal in which the invention can be advantageously implemented in a reduced block diagram.

The block diagram in FIG. 3 presents the multimedia terminal 1, 1' in which the invention can be advantageously implemented in a reduced manner. The terminal in question is suitable for both transmitting and receiving, but the invention can also be applied in connection with simplex terminals. In the multimedia terminal 1, 1' all the functional features presented in the block diagram of FIG. 3 are not necessarily required, but within the scope of the invention it is also possible to apply simpler multimedia terminals 1, 1', for example without data applications 2 and audio means 3. In addition to said data applications 2 and audio means 3 the multimedia terminal also comprises video means 4, such as a video monitor, a video camera or the like. The audio means 3, advantageously comprise a microphone and a speaker/receiver, which is known as such. If necessary, the audio means 3 also comprises audio amplifiers. The data applications 2 are, for example, data files, application programs of a data processor and the like, wherein the data application block 2 can also comprise a data processor (PC, Personal Computer).

To control the functions of the multimedia terminal 1, 1' it comprises a control unit 5, which consists, for example, of a micro controller unit, a micro processing unit, or the like. In addition, the control unit 5 contains memory means MEM e.g. for storing application programs and data and bus interface means I/O for transmitting signals between the control unit 5 and other functional blocks. The multimedia terminal 1,1' also comprises a multimedia block 6, which contains the means needed for encoding/decoding multimedia information and performing data transmission between the multimedia terminal 1, 1' and the data transmission network.

In the transmitting terminal, a video encoding/decoding block 7 conducts the formation of data frames of a video signal to be transmitted, for example, an image produced by a video camera. Some video encoding methods are defined, for instance in the recommendations H.261 and H.263 by the International Telecommunication Union. In the receiving terminal, the procedure is reversed, i.e. an analog video signal is produced from the video data frames, which is then transmitted, for example, to a monitor or to another display device.

An audio encoding/decoding block 8 performs a corresponding transformation of the audio signal to the data frame format in the transmitting terminal and forms an analog audio signal from the received audio data frames in the receiving terminal. In the receiving terminal audio and video signals are also sychronized by delaying the audio signal in a delay block 9. One audio encoding method is defined in the ITU-T recommendation G.723.1 "Dual Rate Speech Coder for Multimedia Communications Transmitting at 5.3 and 6.3 kbit/s" (March 1996).

A data block 10 conducts protocol modifications for modifying the data to be transmitted into data frames suitable for the data transmission system and, in the reception of data frames, transforms them into data corresponding to the original protocol.

Furthermore, the multimedia block 6 contains a multimedia control block 11, for controlling said video encoding/decoding block 7, audio encoding/decoding block 8 and data block 10, as well as data transmission between the communication network and multimedia terminal 1,1'. The multimedia control block 11 controls, for instance, a multiplexer/demultiplexer 12, by means of which the data frame to be transmitted to the communication system at a given time is multiplexed at the transmitting stage, and at the receiving stage the received data frame is transmitted to the correct processing block 7, 8, 10 on the basis of what kind of information the data frame contains. From the multiplexer/demultiplexer, the data frames to be transmitted are directed to a modem 13, in which the signal is modified to a form suitable for the data transmission channel.

As a data transmission channel, for example a general switched telephone network 15 is used, part of which can be a wireless telecommunication network, such as a public land mobile network, PLMN. In the receiving multimedia terminal 1, 1', a modem converts the signals coming via the data transmission channel into digital format, if necessary, wherein the signals in digital format are directed via the multiplexer/demultiplexer 12 to the corresponding processing block 7, 8, 10. The modem 13 also comprises a modem controlling block 14, whereby the control unit 5 controls the operation of the modem and the data transmission. It should also be mentioned that for example in GSM communications, the signals are constantly in digital form, wherein the modem 13 is not necessary.

Figure 4:
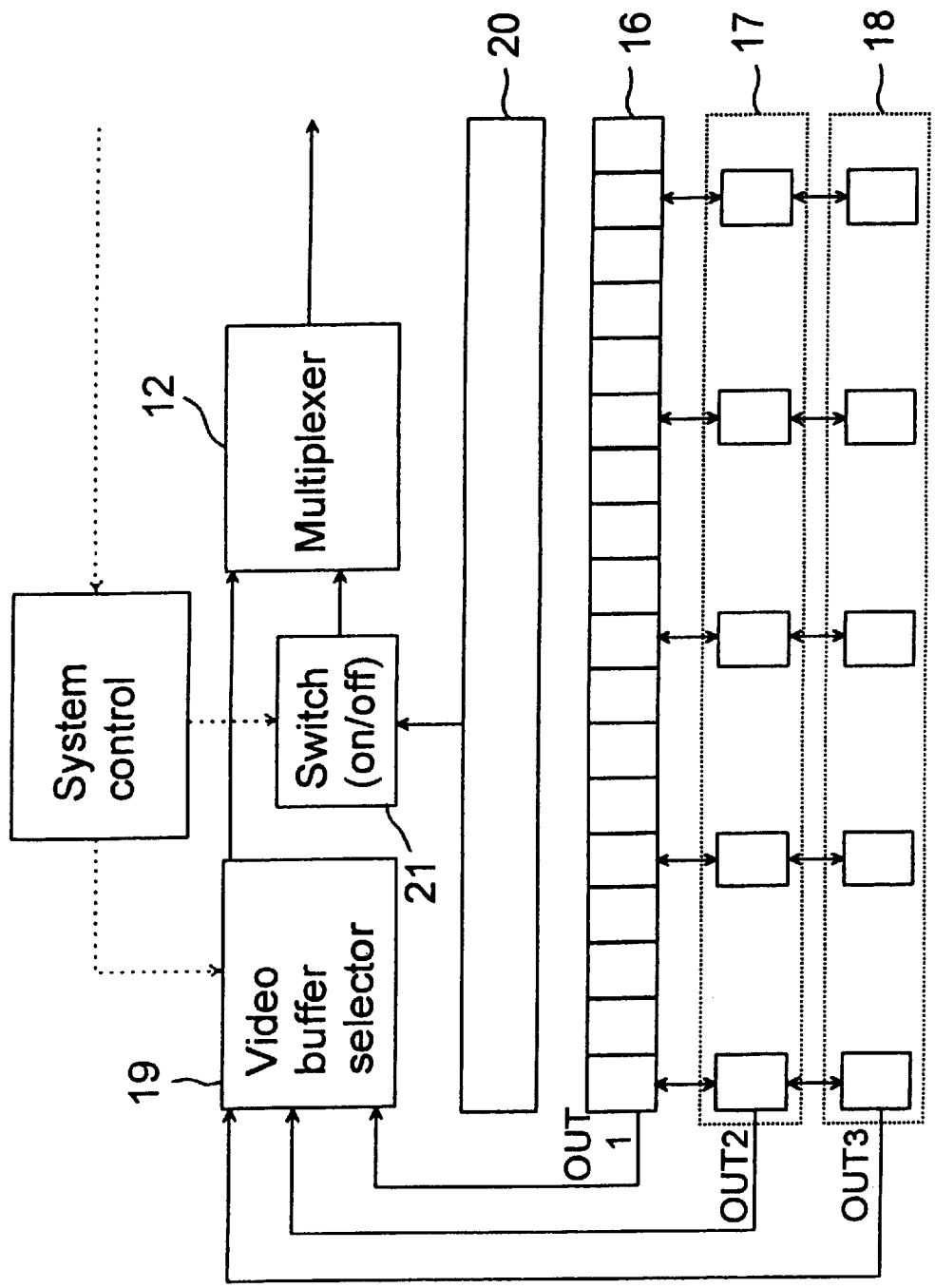
FIG. 4 shows the structure of a transmitting multimedia terminal according to an advantageous embodiment of the invention in a reduced block diagram.

The block diagram of FIG. 4 presents the operation of the multimedia terminal 1' according to an advantageous embodiment of the invention at the transmission stage in audio and video signal transmission. The video encoder 7 (FIG. 3) has constructed video frames of the video signal of the video source, which are stored in a first video frame buffer 16. The first video frame buffer 16 is advantageously provided in the storage means MEM of the multimedia terminal, preferably according to so-called FIFO type (First-In-First-Out), i.e. the data frames are transmitted further in the order written in the buffer. The multimedia terminal 1' is also provided with a second video frame buffer 17 where intra frames are stored, for example by copying from the video frame buffer 16. Another alternative is to store counterparts of the video frames of the first video frame buffer 16 in the second video frame buffer 17, the video frames being generated for example by reducing the resolution. For these video frames, a reference has to be made in the corresponding video frame of the first video frame buffer 16.

In connection with normal video image reproduction, the first video frame buffer 16 is used as a video frame source. Thus, the control unit 5 uses a video buffer selector 19 to select output line OUT1 of this first video frame buffer 16 to be connected further to the multiplexer/demultiplexer 12. In the receiving user multimedia terminal 1, the received data frames are processed and the multiplexer/demultiplexer 12 transmits each received data frame to a decoding block corresponding to its type. Video frames, audio frames and data frames are transmitted to a video encoding/decoding block 7, an audio encoding/decoding block 8, and a data encoding/decoding block 10, respectively. These encoding/decoding blocks 7, 8, 10 can also comprise a buffer memory for the temporary storing of received frames. It is obvious that even though each encoding/decoding block is presented as one block, in a multimedia terminal intended solely for transmitting or receiving, these encoding/decoding blocks comprise only the corresponding encoders and decoders, respectively.

At the stage when the user wishes to use the fast forward or fast rewind function, the respective command is transmitted from the user multimedia terminal 1, preferably via a logical control channel to the service provider multimedia terminal 1'. The command is received and interpreted in this service provider multimedia terminal 1'. On the basis of the command, in this first advantageous embodiment of the invention, the control unit 5 selects output line OUT2 of the second video frame buffer 17 to be further connected to the multiplexer/demultiplexer 12, wherein the next step is to start transmitting the video frames contained in this second video frame buffer 17 to the data transmission channel. If no actual video frames are stored in the second video frame buffer 17 but only counterparts of the frames stored in the first video frame buffer 16, the video information generated in the fast forward or fast rewind function does not correspond to the original video information completely, but, however, to such an extent that the desired location is discernible in the fast forward/rewind. During the fast forward/rewind, the transmission speed is maintained constant, or it can even be somewhat decelerated, wherein at the receiving stage, the image of these intra frames is established at the rate of reception, which the user sees as the fast forward or fast rewind function.

Furthermore, the audio data frames are provided with an audio buffer 20, from which the audio frames are transmitted to the multiplexer/demultiplexer 12 and, controlled by the control unit 5, further to the communication channel. The system also includes an audio switch 21, which can be used to interrupt the transmission during the fast forward or fast rewind function, which further reduces the amount of information transmitted in the fast forward/rewind.

Moreover, the multimedia terminal 1' in the block diagram of FIG. 4 contains a third video frame buffer 18 to be used in connection with a second advantageous embodiment of the invention. In this embodiment, the quantity of information in the video frames contained in the second video frame buffer 17 is reduced and stored in this third video frame buffer 18. The quantity of information can be reduced, for example, by changing a colour image into a black and white image, wherein the transmission of mere luminance information is sufficient. Another possibility is to reduce the resolution of the image, which is not necessarily even discerned with the eye in the fast forward/rewind. Furthermore, the image can be compressed with a compression method of prior art suitable for intra images. In this solution according to the second embodiment of the invention, in order to generate fast forward/rewind, a video buffer selector 19 is used to select output line OUT3 of this third video frame buffer to be connected to the multiplexer/demultiplexer 12, wherein the quantity of information to be transmitted to the data transmission channel is even smaller than in the system according to the first advantageous embodiment of the invention. At the stage of returning from the fast forward or fast rewind function to normal reproduction, the first step is to retrieve the intra frame so that the normal transmission could be restarted. In this advantageous embodiment of the invention, this intra frame is retrieved from the second video frame buffer 17 which also contains a reference to a corresponding location in the first video frame buffer 16. Thus, the next video frames are retrieved according to normal reproduction from the video frame buffer 16.

Even though the invention is described above primarily in connection with multimedia terminals according to the H.324 recommendation and video encoding according to the H.263 recommendation, it is also possible to apply the invention to implement the video image fast forward and fast rewind function in other terminals and by using other video encoding methods.

Furthermore, in connection with the multimedia terminal 1,1' it is possible to use a wireless communication device MS, wherein data transmission can be conducted at least partly in a wireless manner. Also, at least some of the functions of the multimedia terminal 1 can be implemented by using the operational blocks of such a wireless communication device MS. As an example of the wireless communication device, the Nokia 9000 Communicator should be mentioned, which comprises, for instance, memory means, a display device, modem functions and a control unit, wherein it is possible to implement the multimedia terminal 1 according to a preferred embodiment of the invention in most respects by modifications made in the application software of the wireless communication device.

The present invention is not solely restricted to the above presented embodiments, but it can be modified within the scope of the appended claims.

What is claimed is:

1. A method for transmitting video images between multimedia terminals in a data transmission system, in which video images are transmitted by using first video frames (I), in which information encoded from one video image is transmitted, as well as second video frames (P, B), in which information encoded on the basis of two or more video images is transmitted, from which a video image can be formed in the receiver multimedia terminal by using at least one first (I) and at least one second video frame (P, B), wherein, in the method there is provided a fast forward or fast rewind function, and that the fast forward or fast rewind function of the video images is performed primarily by transmitting only first video frames (I) and, wherein {PRIVATE }the quantity of information is reduced by storing counterparts of said first (I) and second video frames (B, P), said counterparts of said first (I) and second video frames (I, B, P) being formed by reducing the quantity of information of said first (I) and second video frames (B, P), wherein during the fast forward or fast rewind function the counterparts of said first (I) and second video frames (B, P) are transmitted.

2. A method for transmitting video images comprising a quantity of image information between a transmitting multimedia terminal and a receiving multimedia terminal connected via a data transmission network, in which video images are transmitted by using first video frames, comprising information encoded from one video image, and by using second video frames, comprising information encoded on the basis of two or more video images, from which video frames video images can be formed by the receiving multimedia terminal, in which method there is provided a fast forward or fast rewind function, for enabling fast forward or fast rewind viewing of video images formed from video frames received at the receiving terminal, wherein said fast forward or fast rewind function is implemented by forming reduced-information counterparts of said first and said second video frames and transmitting said reduced-information counterparts of said first and second video frames from the transmitting multimedia terminal to the receiving multimedia terminal during operation of said fast forward or fast rewind function.

3. A method according to claim 2, wherein said reduced-information counterparts of said first and second video frames are stored in the transmitting multimedia terminal.

4. A method according to claim 2, wherein said first video frames are INTRA-coded video frames and said second video frames are INTER-coded video frames.

5. A method according to claim 2, wherein said reduced-information counterparts of said first and second video frames are formed by reducing the resolution of the video images to be transmitted.

6. A method according to claim 2, wherein said reduced-information counterparts of said first and second video frames are formed by reducing the spatial resolution of the video images to be transmitted.

7. A method according to claim 2, wherein the video images contain luminance and chrominance information and said reduced-information counterparts of said first and second video frames are formed using only the luminance information of said video images.

8. A method according to claim 2, wherein audio information is also transmitted from said transmitting multimedia terminal to said receiving multimedia terminal and the transmission of audio information is interrupted during operation of said fast forward or fast rewind function.

9. A method according to claim 2, wherein said transmitting multimedia terminal is a server connected to said data transmission network.

10. A method according to claim 2, wherein said receiving multimedia terminal is a wireless communications device connected to said data transmission network via a wireless link.

11. A method according to claim 2, wherein said data transmission network is one of the following: the Internet; a general switched telephone network; a public land mobile telephone network.

12. A method according to claim 2, wherein the connection between said transmitting multimedia terminal and said receiving multimedia terminal is a duplex connection which, in addition to enabling transmission of said video frames from said transmitting multimedia terminal to said receiving multimedia terminal, enables transmission of control commands from said receiving multimedia terminal to said transmitting multimedia terminal.

13. A method according to claim 2, wherein operation of said fast forward or rewind function is initiated responsive to a command supplied to said receiving multimedia terminal by a user of the receiving multimedia terminal and transmitted from the receiving multimedia terminal to the transmitting multimedia terminal.

14. A method according to claim 13, wherein said command is transmitted to the transmitting terminal by means of a logical control channel.

15. A data transmission system for transmitting video images comprising a quantity of image information between a transmitting multimedia terminal and a receiving multimedia terminal via a data transmission network providing a connection between said transmitting multimedia terminal and said receiving multimedia terminal, the data transmission system comprising means for forming first video frames comprising information encoded from one video image and means for forming second video frames comprising information encoded on the basis of two or more video images from which video frames video images can be formed by the receiving multimedia terminal, means for transmitting said first and second video frames from said transmitting multimedia terminal to said receiving multimedia terminal and further comprising a fast forward or fast rewind function, for enabling fast forward or fast rewind viewing of video images formed from video frames received at the receiving terminal, wherein said fast forward or fast rewind function is implemented by means for forming reduced-information counterparts of said first and said second video frames in the transmitting multimedia terminal and by arranging said reduced-information counterparts of said first and second-video frames to be transmitted from the transmitting multimedia terminal to the receiving multimedia terminal during operation of said fast forward or fast rewind function.

16. A data transmission system according to claim 15, wherein said data transmission network is one of the following: the Internet; a general switched telephone network; a public land mobile telephone network.

17. A data transmission system according to claim 15, wherein the connection between said transmitting multimedia terminal and said receiving multimedia terminal is a duplex connection which, in addition to enabling transmission of said video frames from said transmitting multimedia terminal to said receiving multimedia terminal, enables transmission of control commands from said receiving multimedia terminal to said transmitting multimedia terminal.

18. A multimedia terminal for transmitting video images comprising a quantity of image information to a receiving multimedia terminal, said multimedia terminal comprising means for forming first video frames comprising information encoded from one video image and means for forming second video frames comprising information encoded on the basis of two or more video images, from which video frames video images can be formed by the receiving terminal, means for transmitting said first and second video frames to said receiving multimedia terminal, the multimedia terminal further comprising a fast forward or fast rewind function, for enabling fast forward or fast rewind viewing of video images formed from video frames received at the receiving multimedia terminal, wherein said fast forward or rewind function is implemented in the multimedia terminal by means for forming reduced-information counterparts of;said first and second video frames and by arranging said reduced-information counterparts of said first and second video frames to be transmitted from the multimedia terminal to the receiving multimedia terminal during operation of said fast forward or fast rewind function.

19. A multimedia terminal according to claim 18, comprising means for storing said reduced-information counterparts of said first and second video frames.

20. A multimedia terminal according to claim 18, wherein said means for forming reduced-information counterparts of said first and second video frames comprise means for reducing the resolution of the video images to be transmitted.

21. A multimedia terminal according to claim 18, wherein said means for forming reduced-information counterparts of said first and second video frames comprise means for reducing the spatial resolution of the video images to be transmitted.

22. A multimedia terminal according to claim 18, wherein the video images contain luminance and chrominance information and said means for forming reduced-information counterparts of said first and second video frames comprise means for using only the luminance information of said video images.

23. A multimedia terminal according to claim 18, further comprising means for transmitting audio information from the multimedia terminal to said receiving terminal and means for interrupting the transmission of audio information during operation of said fast forward or fast rewind function.

24. A multimedia terminal according to claim 18 that is a server connected to a data transmission network.

25. A multimedia terminal according to claim 18 that is a wireless communications device connected to a data transmission network via a wireless link.

26. A multimedia terminal according to claim 18, further comprising means for initiating operation of said fast forward or rewind function responsive to a command received from said receiving multimedia terminal.

27. A multimedia terminal for receiving video images comprising a quantity of image information from a transmitting multimedia terminal, said multimedia terminal comprising means for receiving first video frames comprising information encoded from one video image and means for receiving second video frames comprising information encoded on the basis of two or more video images, from which video frames video images can be formed by the multimedia terminal, the multimedia terminal further comprising a fast forward or fast rewind function, for enabling fast forward or fast rewind viewing of video images formed from video frames received at the multimedia terminal, wherein said fast forward or fast rewind function is implemented in the multimedia terminal by receiving reduced-information counterparts of said first and second video frames during operation of said fast forward or fast rewind function and by arranging said reduced-information counterparts of said first and second video frames for display.

28. A multimedia terminal according to claim 27 that is a wireless communications device connected to a data transmission network via a wireless link.

29. A multimedia terminal according to claim 27, further comprising means for initiating operation of said fast forward or fast rewind function.

30. A multimedia terminal according to claim 27, wherein said means for initiating operation of said fast forward or fast rewind function comprise means for receiving an indication from a user of the multimedia terminal and means for transmitting a command representative of said indication from the multimedia terminal to said transmitting multimedia terminal.

31. A video encoder for encoding video images comprising a quantity of image information, comprising means for forming first video frames comprising information encoded from one video image and means for forming second video frames comprising information encoded on the basis of two or more video images, from which video frames video images can be formed by a corresponding video decoder, the video encoder further comprising. a fast forward or fast rewind function, for enabling fast forward or fast rewind viewing of video images formed from video frames received at said corresponding video decoder, wherein said fast forward or rewind function is implemented in the video encoder by means for forming reduced-information counterparts of said first and second video frames and by arranging said reduced-information counterparts of said first and second video frames for transmission to said corresponding video decoder during operation of said fast forward or fast rewind function.

32. A video decoder for decoding and forming video images comprising a quantity of image information from first video frames and second video frames received from a corresponding video encoder, said first video frames comprising information encoded from one video image and said second video frames comprising information encoded on the basis of two or more video images, wherein the video decoder further comprises a fast forward or fast rewind function, for enabling fast forward or fast rewind viewing of video images formed from video frames received at the video decoder, wherein said fast forward or rewind function is implemented in the video decoder by means for receiving reduced-information counterparts of said first and second video frames from said corresponding video encoder during operation of said fast forward or fast rewind function and by arranging said reduced-information counterparts of said first and second video frames for display.

33. A multimedia terminal including at least a video encoder for encoding video images comprising a quantity of image information, comprising means for forming first video frames comprising information encoded from one video image and means for forming second video frames comprising information encoded on the basis of two or more video images, from which video frames video images can be formed by a corresponding video decoder, the video encoder further comprising a fast forward or fast rewind function, for enabling fast forward or fast rewind viewing of video images formed from video frames received at said corresponding video decoder, wherein said fast forward or rewind function is implemented in the video encoder by means for forming reduced-information counterparts of said first and second video frames and by arranging said reduced-information counterparts of said first and second video frames for transmission to said corresponding video decoder during operation of said fast forward or fast rewind function.

34. A multimedia terminal including at least a video decoder for decoding and forming video images comprising a quantity of image information from first video frames and second video frames received from a corresponding video encoder, said first video frames comprising information encoded from one video image and said second video frames comprising information encoded on the basis of two or more video images, wherein the video decoder further comprises a fast forward or fast rewind function, for enabling fast forward or fast rewind viewing of video images formed from video frames received at the video decoder, wherein said fast forward or rewind function is implemented in the video decoder by means for receiving reduced-information counterparts of said first and second video frames from said corresponding video encoder during operation of said fast forward or fast rewind function and by arranging said reduced-information counterparts of said first and second video frames for display.

* * * * *